United States Patent [19]

Sandercock

[11] 4,014,614
[45] Mar. 29, 1977

[54] HIGH RESOLUTION, HIGH CONTRAST FABRY-PEROT SPECTROMETER

[75] Inventor: John Riddle Sandercock, Affoltern a.A., Switzerland

[73] Assignee: RCA Corporation, New York, N.Y.

[22] Filed: Dec. 29, 1975

[21] Appl. No.: 644,819

[52] U.S. Cl. .......................... 356/106 S; 356/112
[51] Int. Cl.² .......................................... G01B 9/02
[58] Field of Search .......................... 356/106 S, 112

[56] References Cited

UNITED STATES PATENTS

| | | | |
|---|---|---|---|
| 3,512,870 | 5/1970 | Wilson, Jr. et al. | 356/112 |
| 3,729,261 | 4/1973 | Sandercock | 356/112 |
| 3,853,404 | 12/1974 | Barrett | 356/106 S |
| 3,914,055 | 10/1975 | Wolga et al. | 356/106 S |

*Primary Examiner*—John K. Corbin
*Assistant Examiner*—Conrad Clark
*Attorney, Agent, or Firm*—Edward J. Norton; Samuel Cohen; William Squire

[57] ABSTRACT

A Fabry-Perot interferometer includes a plane mirror and a confocal interferometer tandemly aligned so that the output of the former is applied as an input to the latter. Signals are derived for synchronizing the two interferometers by stopping the scan of the plane mirror unit during a portion of each scan cycle and incrementally advancing the scan position of the scan mirror of the confocal unit so that the confocal unit scans the plane mirror unit in a plurality of successive scans.

12 Claims, 2 Drawing Figures

HIGH RESOLUTION, HIGH CONTRAST FABRY-PEROT SPECTROMETER

The present invention relates to Fabry-Perot spectrometers.

BACKGROUND OF THE INVENTION

An ideal spectrometer consists of a narrow filter having an arbitrarily narrow pass band with complete cutoff outside this band. On sweeping the pass band frequency, the throughput of the filter is a measure of the intensity of the light source as a function of frequency. A Fabry-Perot interferometer differs from the ideal filter in two respects. First, the transmission function of the instrument is a series of equally spaced pass bands, not just a single pass band. Secondly, a transmission outside the pass bands is not zero; for a simple Fabry-Perot interferometer, it is in the order of $10^{-3}$-$10^{-4}$. U.S. Pat. No. 3,729,261 issued to the Assignee of the present invention describes a multi-pass Fabry-Perot interferometer having a cut off transmission of less than $10^{-9}$. The fact that the transmission function of the Fabry-Perot interferometer is a series of equally spaced pass bands means that the measured intensity for any particular setting of the interferometer is the sum of intensities in the light source at a series of different wavelengths. However, interpretation is thus difficult. This problem may be overcome by using one or more prefilters where the width of the transmission band of the prefilters is less than the pass band separation of the succeeding filter.

Additionally, the Fabry-Perot interferometers may be constructed in a manner to have different degrees of resolution. The plane mirror Fabry-Perot interferometer has a moderate pass band width and thus moderate resolution. A confocal or spherical mirror Fabry-Perot interferometer has a higher resolution, that is, narrower pass bands. However, the separation between neighboring pass bands is smaller than that of a plane mirror interferometer. If light is passed successively through a relatively wide band filter and then through a plane mirror interferometer and finally through a confocal interferometer, the combined transmission through all of the filters is a single narrow transmission band. The transmission for a particular frequency is the product of the transmissions of the individual filters at that frequency.

It is the present practice to build a moderate resolution spectrometer comprised of a plane mirror Fabry-Perot interferometer combined with a spike interference filter. The spike interference filter pass band width is ideally equal to the spacing between neighboring pass bands of the plane mirror interferometer. However, for very high resolution applications, it is common to use a confocal Fabry-Perot interferometer which, as explained above, has many narrow but closely spaced pass bands. It is difficult although not unknown in the prior art to combine the confocal interferometer with the plane mirror interferometer. Therefore, the confocal interferometer is normally used by itself. Its use as such is therefore limited to those cases where the spectrum of the light source is known to lie only within a very narrow spectral interval. To combine a confocal Fabry-Perot interferometer with a plane mirror Fabry-Perot interferometer requires the synchronization of the movements of the scanning mirrors in the two instruments to within about 50 angstroms. This requirement in the past has made construction and use of such an instrument difficult.

SUMMARY OF THE INVENTION

A Fabry-Perot interferometer includes a plane mirror scanning Fabry-Perot interferometer for providing an output signal in response to an applied input signal and a spherical mirror scanning Fabry-Perot interferometer aligned to receive as an input thereto the output signal of the plane mirror interferometer. Synchronizing means are provided which are responsive to the output signals of the plane and spherical mirror interferometers for substantially stopping the scan of the plane mirror interferometer during a given portion of each scan cycle and for shifting the scan position of the spherical interferometer to a different scan position in a given number of successive scan cycles.

A feature of the invention includes a recording means coupled to the synchronizing means and responsive to the output signals of the interferometers for recording the output signal of the spherical mirror interferometer only during that portion of the scan when the mirrors of the plane mirror interferometer have been stopped in a given cycle. As a result, both the high resolution of the confocal spherical mirror interferometer and the high contrast of the plane mirror interferometer are combined in a single spectrometer.

IN THE DRAWINGS

DESCRIPTION OF THE PREFERRED EMBODIMENT

Figure 1:
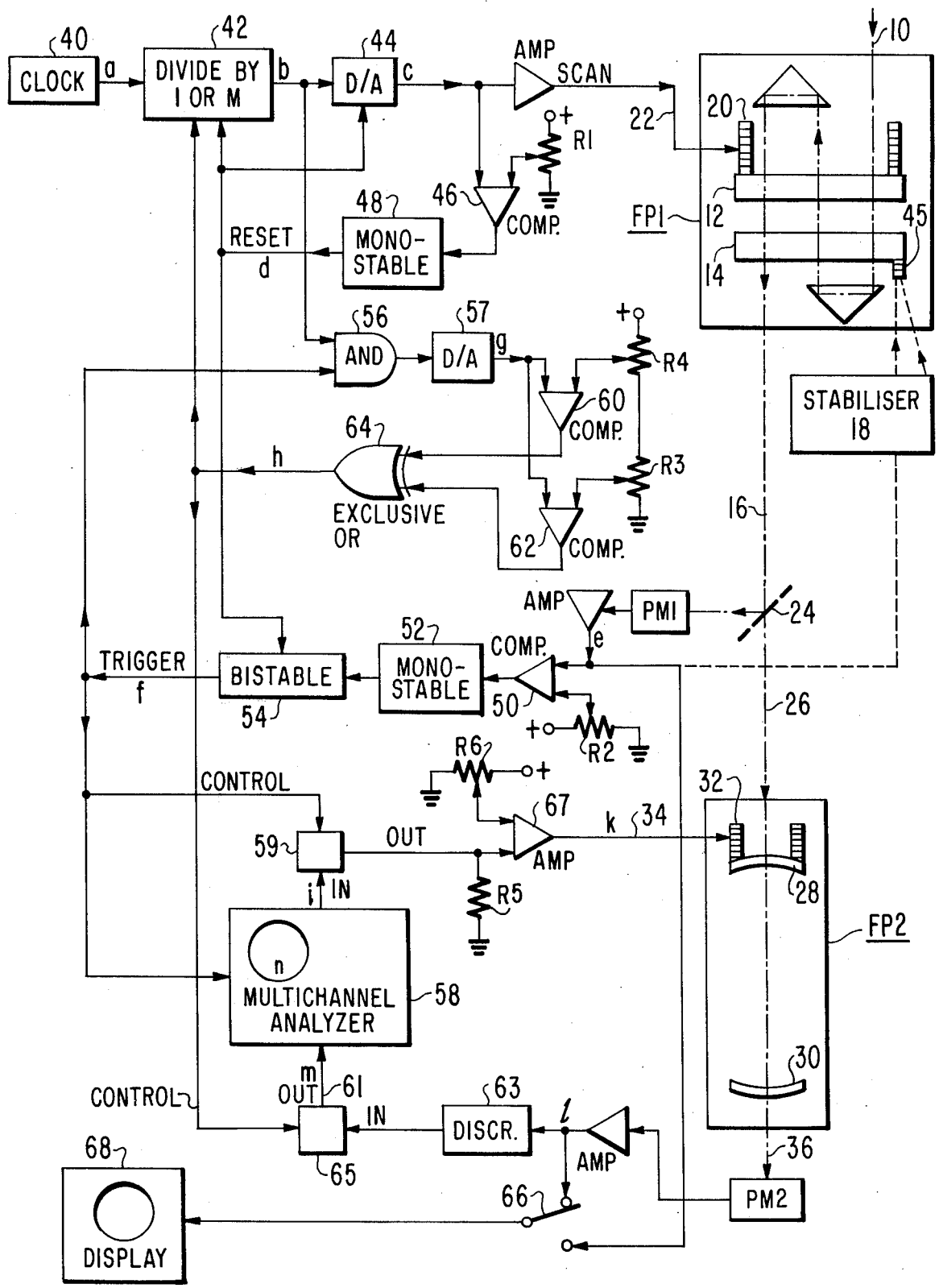
FIG. 1 is a schematic diagram of an apparatus constructed and operated in accordance with one embodiment of the present invention.

In FIG. 1, a plane mirror Fabry-Perot interferometer FP1 receives the light beam 10 to be analyzed and multiple passes the beam in the manner disclosed in the abovenoted U.S. Pat. No. 3,729,261. Interferometer FP1 scans the beam 10 in a well-known manner with mirrors 12 and 14 to provide an output signal 16. The mirrors 12 and 14 may be stabilized by the stabilizing means 18 in the manner described in more detail in the aforementioned U.S. Pat. No. 3,729,261. The stabilizing means 18 may be electronic means as described in this patent or mechanical means as well-known in the interferometer art. Mirrors 12 and 14 are plane mirrors which are translated with respect to each other in a manner to scan the beam 10 as is well-known. To effect this translation, a plurality of transducers 20 are secured to one of the mirrors 12 which, upon receipt of an input signal, at lead 22, effects the scanning mode.

Signal 16 is passed through a partially reflecting mirror 24 for reflecting a small part of this output signal 16 to a suitable photomultiplier cell PM1 while passing the major part (beam 26) as an input to a confocal Fabry-Perot interferometer FP2. Interferometer FP2 has a pair of spaced spherical mirrors 28 and 30 which can also be translated with respect to each other in a well-known manner to achieve a scanning mode of the input signal beam 26. Mirror 28 has a plurality of transducers 32 secured thereto for effecting the translation of the mirror 28 with respect to the mirror 30 upon receipt of a scan input signal on lead 34. The output signal 36 of interferometer FP2 is applied to a photomultiplier PM2.

Photomultiplier PM1 output signal is used in a manner to be described to modify the scan signal curve $c$ which is applied along lead 22 to transducers 20 to effect the scanning operation of the interferometer FP1.

Figure 2:
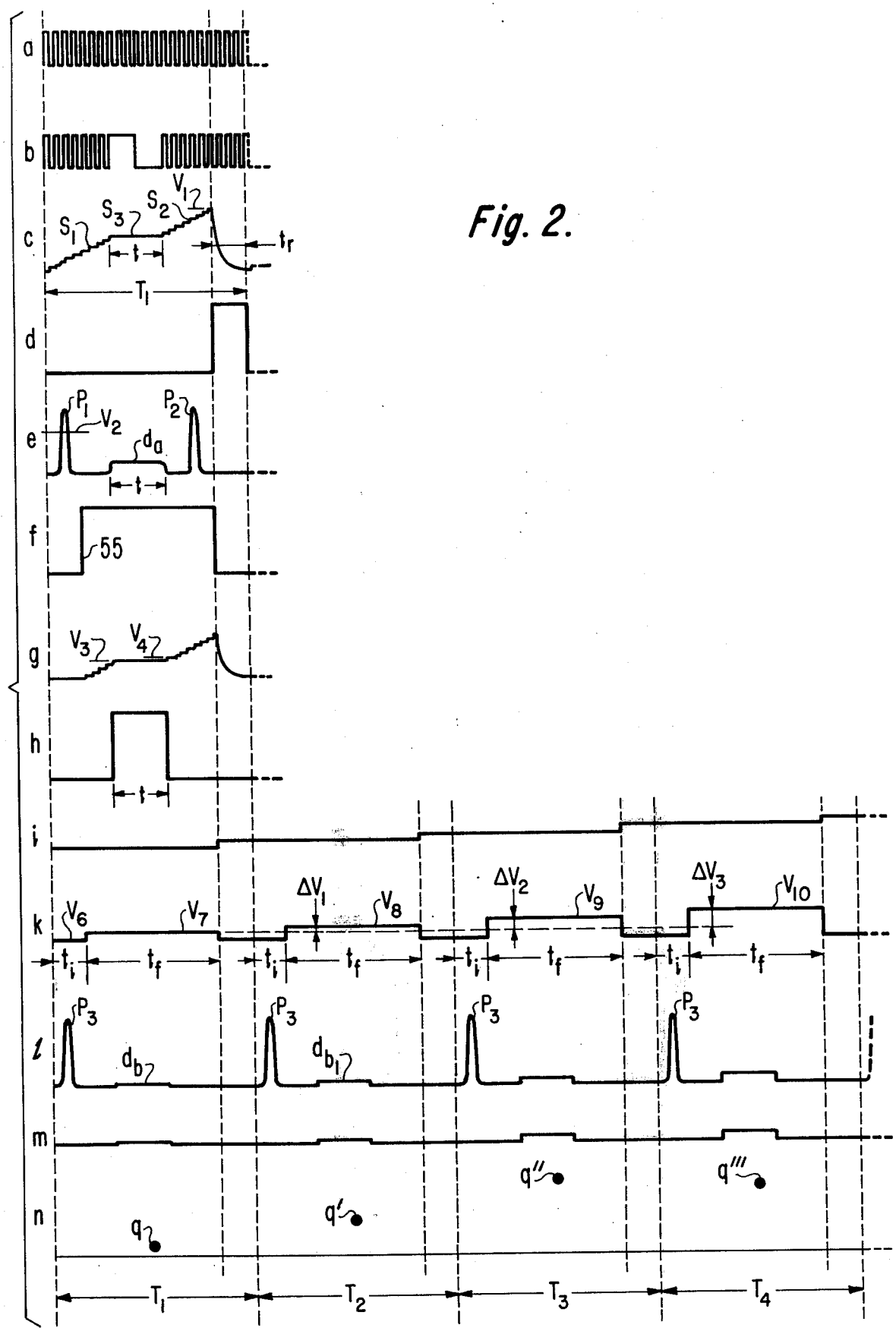
FIG. 2 illustrates various waveforms occurring at designated points in the schematic of FIG. 1 useful for explaining the principles of the present invention.

A second scan signal, curve $k$, FIG. 2, is applied along lead 34 to transducers 32 of interferometer FP2 to effect the scanning of mirror 28 with respect to mirror 30. Upon examination of curve $c$, FIG. 2, it is seen that curve $c$ comprises two ramp portions S1 and S2 and a steady state or plateau portion S3 which portions occur in each scan cycle, the scan cycle comprising the time period $T_1$. A plurality of successive scan periods $T_1$, $T_2$, ... $T_n$ are of equal time duration. The ramp portions S1 and S2 effect the translation of mirror 12 with respect to mirror 14 to thereby cause the mirrors to scan the input signal 10 in a well-known manner. As provided in accordance with the present invention, the portion S3 of the signal is provided to stop the scan fixing the spaced relationship of mirrors 12 and 14 in a predetermined time interval $t$ during period $T_1$. Period $t$ is an important part of a scan cycle in that it represents the period in which the information or data of interest occurs on the output signal 16 of interferometer FP1. This can be more readily understood by referring to the curve $e$ which represents a characterization of the output signal 16 which is converted into an electrical signal suitable for processing by digital circuitry by photomultiplier PM1 through an amplifier. As seen in curve $e$, the curve comprises two peaks P1 and P2 and a smaller signal $d_a$ representing the data signal to be analyzed. The signal $d_a$ is a broad and flat because the scan c has been stopped exactly at the maximum of this signal. Note that the data signal $d_1$ occurs in the period $t$. The peaks P1 and P2 occur at the frequency of the dominant component in beam 10. In a laser light scattering experiment, this dominant component would be light electrically scattered at the laser frequency. It is the signal $d_a$ which is required to be analyzed in high resolution and high contrast by the interferometer operated and constructed in accordance with the present invention. Ordinarily, in the past, interferometers of the plane mirror type provide solely the signal $d_a$, curve $e$. The present invention provides increased resolution to the signal $d_a$.

The apparatus constructed and operated in accordance with present invention passes this high contrast signal $d_a$, curve $e$, through a tandemly aligned spherical mirror confocal Fabry-Perot interferometer FP2 and provides high resolution. This tandem operation is accomplished with high reliability and dependability with a synchronizing circuit to be described. In curve $c$ the time period for slopes S1 and S2 is exaggerated where, in practice, the time period t comprises preferably approximately 80% of the cycle. Additionally, it will be noted that the data signal $d_a$ of curve e occurs in each cycle in which the scan of FP1 is stopped at portion S3. While S3 is shown as comprising a single cycle of the clock signal, it will be appreciated that a number of clock cycles may be provided in the interval $t$ and the level of slope S3 may vary slightly while still maintaining the scan substantially fixed. In effect, it is essential that the scan be either substantially slowed in period t or stopped.

In each scan cycle period $T_1$–$T_n$, the signal represented by curve $k$ has a reference voltage $V_6$, occurring in initial time period $t$ which always includes the time in which the peak $P_1$, curve $e$ occurs. Synchronization of FP1 and FP2 is achieved by setting the voltage $V_6$ at a level to cause the mirrors 28 and 30 of interferometer FP2 to pass the peak P1 of signal 26 so that this appears as peakP3 in output signal 36 of interferometer FP2, curve 1, Fig. 2. In a second time interval, $t_f$, the scan voltage $V_7$ applied to lead 34 is stepped to a predetermined value above the value of voltage $JV_6$. Voltage $V_7$ remains the same for the duration of scan interval $t_f$. The value of the voltage $V_7$ fixes the separation of mirrors 28 and 30 for the period $t_f$ which is the same in duration in each scan cycle. As a result, the frequencies of the signals passed by mirrors 28 and 30 during period $t_f$ is fixed for each cycle. Mirrors 28 and 30 pass while the voltage appearing in the scan portion $t_f$ of the cycle is incrementally increased by $\Delta V$ to advance the mirrors 28 adn 30 with respect to each other to effect a scan mode.The voltage $V_7 = V_6 + \Delta V$, the voltage $V_8 = V_6 + 2\Delta V$ and so on. The separation of these mirrors is thus advanced by the same amount in successive scan cycles. This difference in voltage $\Delta V$ between voltages $V_7$ and $V_8$ is sufficient to provide a slightly different pass band frequency for interferometer FP2 in successive cycles. This results in a slight change in the value of the data signal $d_{b1}$ occurring in period $T_2$ as compared to the value in period $T_1$. In each successive cycle, a successive frequency component of the data signal $d_a$, curve $e$, is measured by the confocal interferometer FP2. After a given (N) plurality of successive scans of interferometer FP2, the scan of signal $d_a$ is complete and curve $k$ is repeated as exhibited in scan periods $T_1$–$T_n$. A plot of $\Delta V$ against the intensity measured during successive periods t gives the spectral distribution in the signal transmitted by interferometer FP1. A typical spectrum will appear as curve n, as recorded by a multi-channel analyzer 58 which may be gated on in a manner to be described so that only those signals received during the interval t are recorded. Each of the points $q$–$q'''$, curve $n$, represents a response of the Fabry-Perot interferometer FP2 ina given correspondingscan cycleI-$T_N$.Thus, the number of scan increments (N) provided to interferometer FP2 determines the resolution i.e., the number of points q provided. The analyzer 58 displays the points $q$–$q'''$, inclusive, in adjacent time frames corresponding to the channels of analyzer 58.

For stability reasons the scan rate of interferometer FP1 should be made relatively fast with a scan period $\tau$ less than or on the order of one second. The total scanning time for one sweep of interferometer FP2 will depend on the number of scanning increments required. If a scan of 60 increments is assumed, the total sweep time is $60\tau$ and so will be the order of one minute or less. Such a scan time may not be long enough for measuring a very weak signal. In this case, many sweeps of FP2 may be required in order to build up the signal, the signal being stored in a multi-scaler such as analyzer 58. As will be shown, in practice, it is convenient to derive the voltage $\Delta V$ from the channel address scaler, i.e., analyzer 58, FIG. 1.

In FIG. 1, an apparatus used to derive curves c and for scanning the interferometers FP1 and FP2, respectively, will now be described. A suitable clock 40 provides a stream of pulses curve a,FIG. 2, which are divided by one or M circuit 42. The letter designations $a$–$n$ appearing in FIG. 1 denotes the curves of FIG. 2 having corresponding letters that appear at those locations in the circuit of FIG. 1. The divide by one or M circuit 42 output signal is applied to a digital-to-analog converter 44 and then through a suitable amplifier to transducers 20 via lead 22. The output of digital-to-analog converter 44 is curve $c$ which, when amplified, is the scan signal applied to mirror 12 transducers 20. The output of converter 44, curve $c$, is applied as an input to a comparator 46 which is set via a suitable variable resistance R1 to provide a trigger signal to a monostable 48 when curve c reaches a predetermined maximum voltage $V_1$ at the end of period $t_f$ during the scanning portion of each scan cycle. The monostable 48, in response to the output of comparator 46 trigger signal, when voltage $V_1$ is sensed, provides a trigger signal curve $d$ for resetting the converter 44 to zero in the time interval $t_r$. The divide by one or M circuit 42 receives a dividing command signal curve $h$ which is a suitable pulse having a time duration $t$ which determines the duration of observation of the data signal $d_a$ of curve $e$. Curve $h$ is derived from the output of interferometer FP1 through the photo-multiplier PM1 output signal, curve e as follows. The signal represented by curve $e$ is applied to a comparator 50 which senses when the peak $P_1$ has reached a predetermined level $V_2$ as determined by the variable resistance R2. When the comparator 50 senses the level V2 an output signal is provided which triggers a monostable 52 which in turn sets the bistable 54 to generate a trigger signal, curve $f$. Monostable 52 serves to provide a slight time delay for the triggering of bistable 54 as occurs between the occurrence of peak $P_1$ and the leading edge 55 in the pulse of curve $f$. Signal f is applied as one input to a suitable AND gate 56 whose second input is supplied by the output of the divide by one or M circuit 42. Thus, AND gate 56 after the occurrence of leading edge 55 passes the clock pulses curve $b$ to digital-to-analog converter 57 producing curve $g$. The signal represented by curve $g$ is applied as one input to a comparator 60 and one input to a second comparator 62. Comparators 60 and 62 through respective second inputs supplied through variable resistances R4 and R3, respectively, provide first and second inputs to an EXCLUSIVE OR gate 64 whose output is curve $h$ which is a rectangular pulse having a width of period $t$. The pulse of curve triggers divide by one or M circuit 42 into dividing by M during the period of each cycle. During the remaining part of the period of each cycle, circuit 42 divides by one. This is best seen by curve $b$.

Stabilizer means 18 is connected to receive a signal, curve $e$, from the output of photo-multiplier PM1 to stabilize the parallel alignment of the mirrors via transducers 45 secured to mirror 14. Stabilizer means 18 is shown with its inputs and outputs in dotted form to indicate that this is an optional feature. It will be apparent that optimum results are achieved when the stabilizer means 18 are included. Stabilizer means 18 is described in U.S. Pat. No. 3,729,261.

The output signal of bistable 54, curve $f$, is also applied to the control terminal of a transmission gate 59. The pulse of curve $f$ opens the gate 59 to pass the signal, curve $i$, FIG. 2, produced by multi-channel analyzer 58. As can be seen from FIG. 2, curve $i$ represents a step signal which has a constant amplitude in each cycle occurring during periods $t_i$ and $t_f$. The amplitude of curve $i$ increases incrementally for each successive cycle for a predetermined number of cycles. The signal represented by curve $i$ is applied as one input to amplifier 67 and a signal from a variable resistance R6 is applied as a second input to amplifier 67. The setting of resistance R6 determines the base line value of voltage V6, curve $k$. The base line voltage V6 of curve $k$ is adjusted so that the peak $P_3$, curve 1, is passed with maximum amplitude in each scan cycle. The presence of peak$P_3$ of maximumamplitude ensures that at the beginning of the scan during period $t_1$ interferometer FP2 transmits the reference frequency, i.e. the frequency of the strongest spectral component. During the period $t_f$ the voltage $V_6$ is incremented by a predetermined amount to values $V_7$, $V_8$etc. on successive scans, so that the frequency transmitted by FP2 is incremented by a predetermined amount from the reference frequency. Since the signal $h$ which controls the scan of FD1 is also related to the same reference frequency it follows that FP1 and FP2 are synchronized. The signal represented by curve $f$ is also applied as an input to multi-channel analyzer 58. The curve $f$ signal advances the multi-channel analyzer by one channel for each scan of the interferometer FP1. That is, the input signals, curve $m$, applied at lead 61, are applied to a different channel for each different scan. However, upon the completion of one full scan of interferometer FP2, in, for example, 60 scans of interferometer FP1, the signal occurring in period $T_1$ will once again be addressed to, for example, channel 1, while the signal occurring in period $T_2$ will once again be applied to channel 2 and so forth. The output of photo-multiplier PM2 is an electrical signal representing the output signal 36 of interferometer FP2. This signal is applied through an amplifier to a suitable discriminator 63 to the input of a transmission gate 65 which is gated open by a signal represented by curve $h$ from EXCLUSIVE OR gate 64. It will be recalled that the curve $h$ is a pulse having a pulse width duration t determining the time during which data signal $d_a$ is being passed by FP1. Thus, only the signal to be analyzed occurring in the period t is passed by transmission gate 65 to the selected channel in the analyzer 58 as determined by curve $f$. A suitable switch 66 is provided for switching the output signal curve 1 to a display 68 for immediate observation if so desired. The signal curve $i$ which is derived from the multi-channel analyzer 58 has a value proportional to the number of the channel at present being addressed. Signal curve $m$ which is recorded by the analyzer 58 is the high resolution spectrum of the light transmitted by the interferometer FP1 during the slow part of the scan, period $t$. Signal curve $m$ is fed on successive scans into successive channels of the multi-channel analyzer. When all the channels have been accessed, the analyzer returns to the first channel and continues the above scanning sequence. The plateau of curve $e$ data portion $d_a$, appears as a plateau because the scan has been stopped on its peak. Thus the time of occurrence of the reference peak $P_1$, curve $e$, serves as a synchronizing pulse for determining the time of occurrence of the pulse of curve $f$ and the pulse of curve $h$.

It will be appreciated that the base line voltage $V_6$, curve $k$, may be adjusted manually to maximize peak $P_3$ and thereby obtain sychronization. Under more severe conditions, for example, during long experiments, it is advantageous to synchronize automatically, i.e. to maximize $P_3$ automatically. This is straightforwardly achieved by modulating the base line voltage $V_6$ i.e., $V_6$ may by slightly increased or decreased on alternate scans of the interferometer FP1. The corresponding variations in the peak amplitude $P_3$ may then be used in a simple phase sensitive feedback loop to adjust the mean base line position.

What is claimed is:

1. In combination:
    a plane mirror Fabry-Perot interferometer of the type including a pair of spaced plane mirrors which can be translated with respect to each other,
    first mirror translating means for cyclically shifting the separation of said plane mirrors at a first rate and means for shifting the separation of said plane mirrors during a portion of each cycle at a second rate slower than said first rate, said plane mirror interferometer providing an output signal having a synchronizing portion and a data portion in each cycle, said data portion occurring during said slower cycle portion,
    a spherical mirror Fabry-Perot interferometer disposed to receive said output signal as an input thereto, said spherical mirror interferometer including a pair of spaced spherical mirrors, and
    second mirror translating means responsive to said output signal synchronizing portion applied as an input thereto for changing the spacing of the spherical mirrors to a given spacing during each said cycle, and for shifting the spacing of said spherical mirrors to a different mirror spacing for each successive cycle whereby said spherical mirror interferometer scans at least said data portion in a plurality of successive cycles.

2. The combination of claim 1 further including display means coupled to said spherical mirror interferometer for displaying said scanned data portion.

3. The combination of claim 1 wherein said first mirror translating means includes detecting and logic means for deriving from said plane mirror output signal a plane mirror interferometer scan signal having a first ramp portion for each said cycle for shifting the spacing of said plane mirrors at said first rate and a second plateau portion for shifting said planar mirrors at said second rate.

4. The combination of claim 1 wherein said second mirror translating means includes means responsive to said first translating means output signal for providing as an output therefrom a scan signal for said spherical mirror interferometer, said last-mentioned signal having a separate, different constant value for each cycle of a given number of cycles of said first means.

5. A Fabry-Perot interferometer comprising:
    a plane mirror scanning Fabry-Perot interferometer wherein a pair of plane mirrors are translated with respect to each other in each scan, said plane mirror interferometer providing an output signal in response to an applied input signal, said output signal including an information portion,
    means coupled to said plane mirror interferometer for substantially stopping each said scan during the generation of said information portion,
    a spherical mirror scanning Fabry-Perot interferometer disposed to receive as an input signal said plane mirror interferometer output signal, said spherical mirror interferometer including a pair of spaced spherical mirrors which can be translated with respect to each other, and
    means coupled to said spherical mirror interferometer for positioning said spherical mirrors at a given spacing during each scan of said plane mirrors, said spherical mirrors being positioned in a separate, different spacing during each of a given plurality of successive scans of said plane mirrors, said plurality of successive scans comprising a single scan of said spherical mirror interferometer.

6. A Fabry-Perot interferometer comprising:
    a plane mirror scanning Fabry-Perot interferometer for providing an output signal in response to an applied input signal,
    a spherical mirror scanning Fabry-Perot interferometer aligned to receive as an input thereto the output signal of said plane mirror interferometer, and
    synchronizing means responsive to the output signal of said plane and spherical mirror interferometers for substantially stopping the scan of said plane and spherical mirror interferometers during a given portion of each scan cycle and for shifting the scan positions of the spherical mirrors in said spherical mirror scanning Fabry-Perot interferometer to a different position in a given number of successive scan cycles.

7. The interferometer of claim 6 further including recording means coupled to said synchronizing means for recording the output signal of said spherical mirror interferometer only during said given portion of each scan.

8. In combination:
    a plane mirror Fabry-Perot scanning interferometer,
    a confocal Fabry-Perot interferometer,
    means for shifting the spacing of the mirrors in said plane mirror interferometer in each scan cycle, said shifting means including means for generating a plane mirror interferometer scan signal, said scan signal comprising a ramp portion which shifts from a first value to a second value and a plateau portion which exhibits a substantially constant value,
    said plane mirror interferometer generating a synchronizing signal and a data signal in each scan cycle in response to a signal applied as an input thereto, said shifting means including means responsive to said synchronizing signal for causing said plateau portion to occur during the occurrence of said data signal for stopping the scan of said input signal, and
    means responsive to said synchronizing signal for generating a confocal interferometer scan signal having a given constant value for each scan cycle, the value of said confocal scan signal being different in a plurality of a given number of successive cycles, wherein each scan signal value corresponds to a given scan position of said confocal interferometer.

9. The combination of claim 8 wherein said scan signal generating means includes pulse generating means and means for deriving said ramp and plateau portions from said pulse generating means and timing means responsive to said pulse generating means for generating a timing signal manifesting the duration of each scan cycle and the duration and time of occurrence of said plateau portion.

10. The combination of claim 9 further including signal display means responsive to said timing signal and the output signal of said confocal interferometer for displaying the output signal of said confocal interferometer occurring only during said plateau portion.

11. The combination of claim 10 wherein said display means includes a multi-channel analyzer arranged to receive as an input said confocal interferometer output signal, said analyzer being responsive to said timing signal for storing said confocal interferometer output signal occurring only during the plateau portion of each scan cycle.

12. In combination:
a Fabry-Perot scanning plane mirror interferometer,
a Fabry-Perot scanning confocal interferometer arranged to receive as an input signal the output signal of said plane mirror interferometer,
synchronizing means coupled to each said interferometer and responsive to the output signal of said plane mirror interferometer applied as an input thereto for generating a first scan signal to cause said plane mirror interferometer to cyclically scan a signal to be analyzed and for substantially stopping the scan of said plane mirror during the same given portion of each cycle of said scan and for generating a second scan signal to cause said confocal interferometer to scan the output signal of said plane mirror interferometer in a given plurality of said cycles by maintaining the confocal interferometer in a separate, different scan position for each said cycles in a given number of cycles, and
means for applying said first and second scan signals to the respective plane mirror and confocal interferometer.

* * * * *